US005637656A

United States Patent [19]

Mizutani

[11] Patent Number: 5,637,656

[45] Date of Patent: Jun. 10, 1997

[54] AQUEOUS RESIN COMPOSITION FOR CAN OUTER SURFACE

[75] Inventor: Manabu Mizutani, Mobara, Japan

[73] Assignee: Mitsui Cytec Ltd., Tokyo, Japan

[21] Appl. No.: 367,251

[22] PCT Filed: Jun. 2, 1994

[86] PCT No.: PCT/JP94/00893

§ 371 Date: Jan. 12, 1995

§ 102(e) Date: Jan. 12, 1995

[87] PCT Pub. No.: WO94/29396

PCT Pub. Date: Dec. 22, 1994

[30] Foreign Application Priority Data

Jun. 3, 1993 [JP] Japan .................................... 5-156320

[51] Int. Cl.[6] ...................................................... C08F 20/00

[52] U.S. Cl. .......................... 525/443; 524/513; 524/515; 524/516; 524/517; 524/522; 525/163

[58] Field of Search .................................... 525/163, 443; 524/513, 515, 516, 517, 522

[56] References Cited

U.S. PATENT DOCUMENTS 3,464,946 9/1969 Downing ................................ 260/29.4

4,981,885 1/1991 Engel et al. ............................ 523/409

FOREIGN PATENT DOCUMENTS

| | | |
|---|---|---|
| 2614145 | 10/1977 | Denmark . |
| 2905494 | 8/1980 | Denmark . |
| 3934485 | 4/1991 | Denmark . |
| 2381982 | 9/1978 | France . |
| 2-283774 | 11/1990 | Japan . |

*Primary Examiner*—Paul R. Michl
*Assistant Examiner*—U. K. Rajguru
*Attorney, Agent, or Firm*—Kanesaka & Takeuchi

[57] ABSTRACT

An aqueous resin composition for outer surface coating of can, which comprises 30–70 parts by weight of a crosslinking agent (A) and 70–30 parts by weight of a film-forming resin (B). This resin composition has been developed so as to have excellent resistance to pasteurization, an excellent hardness and excellent processability and to give reduced fuming.

In the resin composition, A is a co-condensation product between an alkyl-etherified amino resin and a hydroxycarboxylic acid and contains a mononuclear component in an amount of 40% or less; B is an acrylic resin or a polyester resin; and both A and B must be soluble or dispersible in an aqueous medium.

12 Claims, No Drawings

AQUEOUS RESIN COMPOSITION FOR CAN OUTER SURFACE

This application is a 371 of PCT/JP94/00893 filed Jun. 02, 1994.

TECHNICAL FIELD

The present invention relates to an aqueous resin composition for outer surface coating of can, which gives a coating film of excellent resistance to pasteurization, excellent hardness and excellent processability and which generates, during the baking of the coating film, a reduced amount of a vapor or mist of low-molecular weight (low fuming) from the alkyl-etherified amino resin component.

BACKGROUND ART

In recent years, conventional solvent type coatings are being shifted to aqueous coatings in order to prevent the air pollution caused by the organic vapors emitted from said solvent type coatings.

Ordinary aqueous coatings for can comprise a film-forming resin and a crosslinking agent. As the crosslinking agent, there is mainly used an alkyl-etherified melamine resin or an alkyl-etherified benzoguanamine resin.

As these amino resins, there is used an alkyl-etherified amino resin containing a functional group such as imino group, methylol group or the like, or a completely alkyl-etherified amino resin. There is also used an amino resin containing a mononuclear component in a large amount, in order to allow the resulting aqueous coating to have sufficient water solubility.

When such an amino resin is used as the crosslinking agent, however, a vapor of low-molecular weight substance is emitted from the alkyl-etherified amino resin during the baking of the aqueous coating composition containing the amino resin, and reaches the inner wall of the curing oven and condenses; the condensate drops on the coated article; resultantly, there occur problems such as the deterioration of coated surface, the necessity of frequent cleaning of oven inside, and the like. Hence, an improvement therefor is desired.

There also remain, in some cases, a problem of the insufficient stability of coating caused by an alkyl-etherified amino resin of insufficient water solubility, and a problem of poor resistance to pasteurization, insufficient hardness and processability, caused by the high content of mononuclear component.

The techniques for making water-soluble a water-insoluble alkyl-etherified amino resin are disclosed in U.S. Pat. No. 3,464,946, U.S. Pat. No. 3,444,114, etc. When the resulting amino resin is used as a crosslinking agent for outer surface coating of can, however, the coating is not satisfactory in fuming during baking as well as in film properties such as resistance to pasteurization, hardness, processability and the like.

DISCLOSURE OF THE INVENTION

The object of the present invention is to provide an aqueous resin composition for outer surface coating of can, which gives a coating film of excellent resistance to pasteurization, excellent hardness and excellent processability and which can greatly reduce fuming during the baking of coating film.

The present inventor made an extensive study in order to solve the above-mentioned problems. As a result, the present inventor found out that the molecular weight of an amino resin used as a crosslinking agent has a sufficient influence on the resistance to pasteurization and on the processability of coating film as well as on the fuming during baking. The present inventor also found out that when an amino resin is made water-soluble by treating with a hydroxycarboxylic acid and the resulting amino resin-oxycarboxylic acid condensate containing a lower amount of a mononuclear component is used as a crosslinking agent, the resulting aqueous coating retains excellent processability, gives a coating film of excellent hardness and resistance to pasteurization and reduces fuming during baking. The finding has led to the completion of the present invention.

The present invention provides an aqueous resin composition for outer surface coating of can, which is characterized by comprising 30–70 parts by weight of a crosslinking agent (A) which is obtained by subjecting an alkyl-etherified amino resin and a hydroxycarboxylic acid to co-condensation and which contains a mononuclear component in an amount of 0–40%, and 70–30 parts by weight of a film-forming resin (B) which is at least one resin selected from acrylic resins and polyester resins and which is soluble or dispersible in an aqueous medium.

The composition of the present invention obtained as above has excellent resistance to pasteurization, an excellent hardness and excellent processability; generates a reduced amount of a vapor or mist of low-molecular weight from the amino resin component during the baking of the coating produced with the composition; and is very useful as an aqueous resin composition for outer surface coating of can.

BEST MODE FOR CARRYING OUT THE INVENTION

In the present invention, typical examples of the alkyl-etherified amino resin are alkyl-etherification products of aminotriazine resins (e.g. melamine resin, benzoguanamine resin, acetoguanamine resin, cyclohexylguanamine resin and spiroguanamine resin) and urea derivative resins (e.g. glycoluril resin). These resins can be used singly or in combination of two or more. Of them, a benzoguanamine resin or a spiroguanamine resin is preferable in view of the resistance to pasteurization and processability.

These resins are generally constituted by an oligomer component containing at least one triazine nucleus in the molecule. Particularly, a completely alkyl-etherified amino resin used in the present invention generally contains a mononuclear component in a large amount.

As the alcohol component constituting the alkyl ether, there can be cited aliphatic alcohols such as methanol, ethanol, n-propanol, isopropanol, n-butanol, isobutanol, sec-butanol, tert-butanol, n-amyl alcohol, isoamyl alcohol, tert-amyl alcohol, n-hexyl alcohol, sec-hexyl alcohol, 2-methylpentanol, 2-ethylbutyl alcohol, sec-heptyl alcohol, n-octyl alcohol, 2-ethylhexyl alcohol, sec-octyl alcohol, cyclohexanol and the like; and aromatic alcohols such as benzyl alcohol and the like.

As the alcohol component, an ether alcohol can also be used. It can be exemplified by ethylene glycol monomethyl ether, ethylene glycol monoisopropyl ether, ethylene glycol monobutyl ether, diethylene glycol monomethyl ether, triethylene glycol monomethyl ether, propylene glycol monomethyl ether, propylene glycol monoisopropyl ether, etc. These alcohol components can be used singly or in combination of two or more.

Typical examples of the hydroxycarboxylic acid used in the production of the crosslinking agent (A) of the present invention are citric acid, malic acid, tartaric acid, lactic acid, gallic acid, salicylic acid and dimethylolpropionic acid. These acids can be used singly or in combination of two or more.

The co-condensation reaction is conducted by subjecting an alkyl-etherified amino resin and a hydroxycarboxylic acid to thermal condensation until the content of a mononuclear component becomes 40% or less. The reaction is preferably conducted while confirming the content of the mononuclear component by gel permeation chromatography (GPC).

The co-condensation reaction is generally conducted in an organic solvent such as ketone type solvent (e.g. methyl ethyl ketone or methyl isobutyl ketone), alcohol type solvent (e.g. methanol or n-butanol), aromatic solvent (e.g. xylene or toluene) or the like, with heating generally in the range of 60° to 130° C., preferably in the range of 80° to 120° C. After the completion of the co-condensation reaction, the organic solvent is removed from the reaction mixture by vacuum or the like.

The proportions of the alkyl-etherified amino resin and the hydroxycarboxylic acid are such that the oxycarboxylic acid is used in an amount of about 0.5–50 parts by weight, preferably about 5–30 parts by weight per 100 parts by weight of the former.

When the amount of the hydroxycarboxylic acid used is less than about 0.5 part by weight, it is difficult to dissolve or disperse a hydrophobic alkyl-etherified amino resin into an aqueous medium. With more than 50 parts by weight, the resulting coating film cannot have sufficient hydrophobicity and its resistance to pasteurization is poor.

When the content of the mononuclear component is higher than 40%, there is obtained a coating film of low resistance to pasteurization, poor processability and insufficient hardness. Further, the fuming during baking is active and the curing oven is stained. The content of the mononuclear component is preferably 30% or less.

The amino resin-acid co-condensate is neutralized or partially neutralized with a known basic compound such as alkylamine, alkanolamine or the like and thereby is made water-soluble or water-dispersible.

These amines include monoethanolamine, dimethylamine, diethylamine, triethylamine, triethanolamine, diethylethanolamine, dimethylethanolamine, 2-amino-2-methyl-1-propanol, etc. These amines can be used singly or in combination of two or more.

The film-forming resin (B) of the present invention has no particular restriction as long as it is soluble or dispersible in an aqueous medium (water or a solvent miscible with water) and is reactive with the crosslinking agent (A). The film-forming resin (B) includes, for example, an acrylic resin obtained from an $\alpha,\beta$-monoethylenically unsaturated carboxylic acid, an alkyl or hydroxyalkyl ester thereof, or an acrylamide derivative, or obtained by, as necessary, copolymerizing said monomer with a copolymerizable vinyl compound or the like. The copolymerization can be conducted in the presence of a radical catalyst such as azobisisobutyronitrile, benzoyl peroxide or the like at 130°–160° C.

The film-forming resin (B) also includes an oil-free polyester resin obtained by subjecting two components, i.e. an acid component and an alcohol component to polycondensation, and a polyester resin obtained by modifying the oil-free polyester resin with an oil or a fatty acid. As the acid component, there are used a dicarboxylic acid such as phthalic acid, isophthalic acid, orthophthalic acid, terephthalic acid, adipic acid, maleic acid, succinic acid, itaconic acid or the like and, as necessary, a tri- or higher carboxylic acid such as trimellitic acid or the like. These acids may be used in the form of an ester-forming derivative such as acid anhydride, methyl ester or the like. As the alcohol component, there are used a glycol such as ethylene glycol, propylene glycol, neopentyl glycol or the like and, as necessary, a tri- or higher alcohol such as trimethylolpropane, pentaerythritol or the like.

The above polycondensation can be conducted by a known process. When an oil is used, the polycondensation is conducted, for example, by reacting the oil with a polyhydric alcohol in the presence of an ester exchange catalyst such as lithium hydroxide or the like at 200°–260° C. and then reacting the reaction product with a polybasic acid, a polyhydric alcohol, etc. at 180°–250° C. When no oil is used, the polycondensation is conducted, for example, by reacting raw materials at 180°–250° C.

It is also possible to use, as the film-forming resin (B), a mixture of the acrylic resin and the polyester resin both mentioned above, or modification products of said resins.

The aqueous resin composition for outer surface coating of can comprises the crosslinking agent (A) and the film-forming resin (B) soluble or dispersible in an aqueous medium, both mentioned above. The composition further comprises, as necessary, various additives ordinarily used, such as surface-smoothening agent (leveling agent), dispersing agent, tackifier, defoaming agent, pigment and the like.

The proportions of the crosslinking agent (A) and the film-forming resin (B) used are 30∝70 parts by weight (A) and 70–30 parts by weight (B), with 40–50 parts by weight (A) and 60–50 parts by weight (B) being optimum proportions in view of the curability of the resulting composition and the properties of the film formed with the composition.

To the resin composition of the present invention can be added, as necessary, an amine-blocked acid catalyst as a curing aid, for example, p-toluenesulfonic acid, dodecylbenzenesulfonic acid, dinonylnaphthalenedisulfonic acid or the like, in an amount of 0.1–2 parts by weight per 100 parts by weight of the resin solid content, whereby the present resin composition can be made into a coating.

The aqueous resin composition for outer surface coating of can according to the present invention, when coated on a metal can or plate using a roll coater or a coating machine and baked at 100°–250° C. for 5 seconds to 20 minutes, generates a reduced amount of a vapor or mist of low-molecular weight and provides a film of excellent processability, hardness and resistance to pasteurization.

The production Examples and Examples of the present invention are shown below. In the following, parts and % refer to parts by weight and % by weight, respectively. Each solid content is a value obtained when a resin obtained is placed in a metallic dish and heated at 125° C. for 30 minutes and the resulting residue is measured.

PRODUCTION EXAMPLE 1

Methyl-etherified melamine resin (a1):

Into a 2-liter four-necked flask equipped with a stirrer, a thermometer, a reflux condenser and a cooled trap for solvent recovery and by-product were fed 320 parts (10 moles) of methanol, 300 parts (8 moles) of 80% paraformaldehyde and 126 parts (1 mole) of melamine. The mixture was adjusted to pH 10.5 with a 30% aqueous NaOH solution and heated to 70° C. to conduct a hydroxymethylation reaction for 1 hour.

After the completion of the reaction, the reaction mixture was cooled, then adjusted to pH 1.0 with 50% sulfuric acid, and subjected to a primary methylation reaction at 40° C. for 30 minutes. The reaction mixture was adjusted to pH 10.0 with a 30% aqueous NaOH solution, and remaining formaldehyde, methanol and water were removed at a reduced pressure.

Thereinto was fed 320 parts (10 moles) of methanol. The mixture was adjusted to pH 1.0 with 50% sulfuric acid and subjected to a secondary methylation reaction at 40° C. for 30 minutes.

Then, the reaction mixture was adjusted to pH 10.0 with a 30% aqueous NaOH solution, and methanol and water were removed at a reduced pressure. The resulting precipitate (salts) was removed by filtration to obtain a methyl-etherified melamine resin.

The thus-obtained methyl-etherified melamine resin was a colorless transparent viscous liquid and had a solid content of 98.0%, a viscosity (Gardner) of Y and a mononuclear component content of 71% as measured by GPC.

PRODUCTION EXAMPLE 2

Methyl- and butyl-etherified benzoguanamine resin (a2):

Into a 2-liter four-necked flask equipped with a stirrer, a thermometer, a reflux condenser and a cooled trap for solvent recovery and by-product were fed 256 parts (8 moles) of methanol, 300 parts (8 moles) of 80% paraformaldehyde and 187 parts (1 mole) of benzoguanamine. The mixture was adjusted to pH 10.5 with a 30% aqueous NaOH solution and heated to 70° C. to conduct a hydroxymethylation reaction for 1 hour.

After the completion of the reaction, the reaction mixture was cooled, then adjusted to pH 2.5 with 50% sulfuric acid, and subjected to a primary methylation reaction at 40° C. for 1 hour.

The reaction mixture was adjusted to pH 11.0 with a 30% aqueous NaOH solution, and remaining formaldehyde, methanol and water were removed at a reduced pressure.

Thereinto was fed 320 parts (10 moles) of methanol. The mixture was adjusted to pH 1.5 with 50% sulfuric acid and subjected to a secondary methylation reaction at 40° C. for 1 hour.

The reaction mixture was adjusted to pH 10.5 with a 30% aqueous NaOH solution, and remaining methanol and water were removed at a reduced pressure.

Finally, 148 parts (2 moles) of butanol was fed. The mixture was adjusted to pH 1.0 with 50% sulfuric acid and subjected to a butylation reaction at 70° C. for 1 hour. The reaction mixture was adjusted to pH 9 with a 30% aqueous NaOH solution, and butanol was removed at a reduced pressure.

The residue was concentrated and the resulting precipitate (salts) was removed by filtration to obtain a methyl- and butyl-etherified benzoguanamine resin.

The thus-obtained methyl- and butyl-etherified benzoguanamine resin was a colorless transparent viscous liquid and had a solid content of 99.0%, a viscosity (Gardner) of Z and a mononuclear component content of 67% as measured by GPC.

PRODUCTION EXAMPLE 3

Methyl- and butyl-etherified glycoluril resin (a3):

Into a 2-liter four-necked flask equipped with a stirrer, a thermometer, a reflux condenser and a cooled trap for solvent recovery and by-product were fed 256 parts (8 moles) of methanol, 225 parts (6 moles) of 80% paraformaldehyde and 142 parts (1 mole) of glycoluril. The mixture was adjusted to pH 10.5 with a 30% aqueous NaOH solution and heated to 80° C. to conduct a hydroxymethylation reaction for 1 hour.

After the completion of the reaction, the reaction mixture was cooled, then adjusted to pH 1.0 with 50% sulfuric acid, and subjected to a primary methylation reaction at 60° C. for 1 hour.

The reaction mixture was adjusted to pH 7.5 with a 30% aqueous NaOH solution, and remaining formaldehyde, methanol and water were removed at a reduced pressure.

Thereinto was fed 256 parts (8 moles) of methanol. The mixture was adjusted to pH 1.0 with 50% sulfuric acid and subjected to a secondary methylation reaction at 60° C. for 1 hour. The reaction mixture was adjusted to pH 7.5 with a 30% aqueous NaOH solution, and methanol and water were removed at a reduced pressure.

Finally, 148 parts (2 moles) of butanol was fed. The mixture was adjusted to pH 1.0 with 50% sulfuric acid and subjected to a butylation reaction at 70° C. for 1 hour.

The reaction mixture was adjusted to pH 7.5 with a 30% aqueous NaOH solution, and butanol was removed at a reduced pressure. The residue was concentrated and the resulting precipitate (salts) was removed by filtration to obtain a methyl- and butyl-etherified glycoluril resin.

The thus-obtained methyl- and butyl-etherified glycoluril resin was a light-yellow transparent viscous liquid and had a solid content of 97.5%, a viscosity (Gardner) of W and a mononuclear component content of 87% as measured by GPC.

PRODUCTION EXAMPLE 4

Butyl-etherified spiroguanamine resin (a4):

Into a 2-liter four-necked flask equipped with a stirrer, a thermometer, a reflux condenser and a cooled trap for solvent recovery and by-product were fed 740 parts (10 moles) of butanol, 563 parts (10 moles) of 80% paraformaldehyde and 434 parts (1 mole) of spiroguanamine. The mixture was adjusted to pH 10.5 with a 30% aqueous NaOH solution and heated to 90° C. to conduct a hydroxymethylation reaction for 7 hour.

After the completion of the reaction, the reaction mixture was cooled, then adjusted to pH 3.0 with 50% sulfuric acid, and subjected to a primary butylation reaction at 70° C. for 10 hours.

The reaction mixture was adjusted to pH 10.5 with a 30% aqueous NaOH solution, and remaining formaldehyde, methanol and water were removed at a reduced pressure.

Thereinto was fed 740 parts (10 moles) of methanol. The mixture was adjusted to pH 2.0 with 50% sulfuric acid and subjected to a secondary butylation reaction at 70° C. for 10 hours.

Then, the reaction mixture was adjusted to pH 10.5 with a 30% aqueous NaOH solution, and butanol and water were removed at a reduced pressure. The resulting precipitate (salts) was removed by filtration to obtain a butyl-etherified spiroguanamine resin.

The thus-obtained butyl-etherified spiroguanamine resin was a light-yellow transparent viscous liquid and had a solid content of 98.0%, a viscosity (Gardner) of $Z_2$ and a mononuclear component content of 65% as measured by GPC.

PRODUCTION EXAMPLE 5

Co-condensate (a5) between methyl-etherified melamine resin and hydroxycarboxylic acid:

Into a 2-liter four-necked flask equipped with a stirrer, a thermometer, a reflux condenser and a cooled trap for solvent recovery and by-product were fed 100 parts of a methyl-etherified melamine resin (a1), 15 parts of dimethylolpropionic acid (as a hydroxycarboxylic acid) and 50 parts of n-butanol. The mixture was stirred at 110° C. for 3 hours to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of $Z_3$ at 25° C. and a mononuclear component content of 30% as measured by GPC.

PRODUCTION EXAMPLE 6

Co-condensate (a6) between methyl- and butyl-etherified benzoguanamine resin and hydroxycarboxylic acid:

Into a 2-liter four-necked flask equipped with a stirrer, a thermometer, a reflux condenser and a cooled trap for solvent recovery and by-product were fed 100 parts of a methyl- and butyl-etherified benzoguanamine resin (a2), 15 parts of dimethylolpropionic acid (as an oxycarboxylic acid) and 50 parts of n-butanol. The mixture was stirred at 110° C. for 5 hours to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of T at 25° C. and a mononuclear component content of 20% as measured by GPC.

PRODUCTION EXAMPLE 7

Co-condensate (a7) between methyl- and butyl-etherified glycoluril resin and hydroxycarboxylic acid:

Into a 2-liter four-necked flask equipped with a stirrer, a thermometer, a reflux condenser and a cooled trap for solvent recovery and by-product were fed 100 parts of a methyl- and butyl-etherified glycoluril resin (a3), 15 parts of dimethylolpropionic acid (as a hydroxycarboxylic acid) and 50 parts of n-butanol. The mixture was stirred at 110° C. for 7 hours to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of W at 25° C. and a mononuclear component content of 37% as measured by GPC.

PRODUCTION EXAMPLE 8

Co-condensate (a8) between butyl-etherified spiroguanamine resin and hydroxycarboxylic acid:

Into a 2-liter four-necked flask equipped with a stirrer, a thermometer, a reflux condenser and a cooled trap for solvent recovery and by-product were fed 100 parts of a butyl-etherified spiroguanamine resin (a4), 15 parts of dimethylolpropionic acid (as a hydroxycarboxylic acid) and 50 parts of n-butanol. The mixture was stirred at 110° C. for 10 hours to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of $Z_3$ at 25° C. and a mononuclear component content of 15% as measured by GPC.

PRODUCTION EXAMPLE 9

Co-condensate (a9) between methyl-etherified melamine resin and hydroxycarboxylic acid:

Into a 2-liter four-necked flask equipped with a stirrer, a thermometer, a reflux condenser and a cooled trap for solvent recovery and by-product were fed 100 parts of a methyl-etherified melamine resin (a1), 30 parts of lactic acid (as a hydroxycarboxylic acid) and 50 parts of n-butanol. The mixture was stirred at 110° C. for 3 hours to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of $Z_2$ at 25° C. and a mononuclear component content of 7% as measured by GPC.

PRODUCTION EXAMPLE 10

Co-condensate (a10) between methyl-etherified melamine resin and hydroxycarboxylic acid:

Into a 2-liter four-necked flask equipped with a stirrer, a thermometer, a reflux condenser and a cooled trap for solvent recovery and by-product were fed 100 parts of a methyl-etherified melamine resin (a1 ), 10 parts of tartaric acid (as a hydroxycarboxylic acid) and 50 parts of n-butanol. The mixture was stirred at 110° C. for 3 hours to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of $Z_2$ at 25° C. and a mononuclear component content of 20% as measured by GPC.

PRODUCTION EXAMPLE 11

Co-condensate (a11) between methyl-etherified melamine resin and hydroxycarboxylic acid:

Into a 2-liter four-necked flask equipped with a stirrer, a thermometer, a reflux condenser and a cooled trap for solvent recovery and by-product were fed 100 parts of a methyl-etherified melamine resin (a1), 15 parts of dimethylolpropionic acid (as a hydroxycarboxylic acid) and 50 parts of n-butanol. The mixture was stirred at 100° C. for 1 hour to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of W at 25° C. and a mononuclear component content of 43% as measured by GPC.

PRODUCTION EXAMPLE 12

Co-condensate (a12) between methyl-etherified melamine resin and hydroxycarboxylic acid:

Into a 2-liter four-necked flask equipped with a stirrer, a thermometer, a reflux condenser and a cooled trap for solvent recovery and by-product were fed 100 parts of a methyl-etherified melamine resin (a1), 15 parts of dimethylolpropionic acid (as a hydroxycarboxylic acid) and 50 parts of n-butanol. The mixture was stirred at 80° C. for 1 hour to conduct a reaction.

Then, n-butanol was distilled off at a reduced pressure at 80° C. 20 parts of ethylene glycol monobutyl ether was added, whereby was obtained an intended co-condensate having a solid content of 80%, a Gardner viscosity of T at 25° C. and a mononuclear component content of 55% as measured by GPC.

PRODUCTION EXAMPLE 13

Water-soluble polyester resin:

Into a four-necked flask equipped with a stirrer, a thermometer, a dropping tank, a nitrogen-blowing tube, a reflux condenser and a cooled trap for solvent recovery and by-product were fed 20.2 parts of ethylene glycol, 34.5 parts of neopentyl glycol, 23.3 parts of adipic acid and 17.4 parts of phthalic anhydride. The mixture was heated to 220° C. with stirring while nitrogen gas was being introduced.

A reaction was conducted while the water generated by condensation was being removed out of the system. When the acid value of the reaction mixture reached 5 or below, cooling was initiated. At 170° C. there were added 5.2 parts of trimellitic anhydride and 9.4 parts of adipic acid to continue to the reaction. When the acid value reached 65, the reaction was terminated.

The reaction mixture was cooled to 160° C. 100 parts of butyl cellosolve was added and the mixture was cooled, whereby was obtained a transparent viscous polyester resin having a solid content of 50% and an acid value of 65.

The GPC measurement for each co-condensate between amino resin and acid, obtained in Production Examples 5–12 was conducted under the following conditions.

Column: Finepak GEL 101 (a product of JASCO Corporation)
Solvent: THF
Flow rate: 0.5 ml/min
Temperature: 30° C.
Sample concentration: 0.5 g/10 g (THF)
Amount fed: 100 μl
Detector: Differential refractometer

EXAMPLES 1–12 AND COMPARATIVE EXAMPLES 1–12

As the film-forming resin soluble or dispersible in an aqueous medium, there was used a commercially available acrylic resin [Almatex WA 911 (a product of Mitsui Toatsu Chemicals, Inc.), solid content=60%, viscosity=$Z_1$–$Z_4$, acid value=26–31], or the water-soluble polyester resin produced in Production Example 13. Coating compositions were prepared according to the formulations shown in Table 1 and Table 2. Neutralization or partial neutralization with dimethylethanolamine was conducted, whereby aqueous varnishes were prepared.

To each of the aqueous varnishes were added butyl cellosolve and water for solid content adjustment. Thereto were added 0.5% of p-toluenesulfonic acid and 0.5% of a silicon-based leveling agent, whereby aqueous resin compositions were obtained.

Each of the aqueous resin compositions was coated on a tinplate sheet so that the resulting film had a thickness of 8 μm after drying. Then, baking and curing was conducted at 180° C. for 10 minutes in a hot-air oven to form a dry coating film.

Each of the dry coating films obtained in Examples and Comparative Examples was tested for film properties and the results are shown in Table 1 and Table 2.

The test methods for film properties were as follows.

(1) Gloss

Measured using a grossmeter with 60°.

(2) Pencil hardness

Evaluated using a Mitsubishi pencil Uni.

(3) Cross-cutting

100 Squares were formed on a coating film by cutting the film surface with a cutter knife at intervals of 1 mm. Then, a cellophane tape with a sticky adhesive was applied onto the coating film and peeled off. The number of the squares remaining without being removed was counted and used for evaluation of crosscutting.

(4) Erichsen value

Measured using an Erichsen tester according to JIS B 7729-1961.

(5) Impact value

There were used a DuPont type impact tester and a ball of ½ inch (diameter) and 500 g (weight) according to JIS K 5400-1979. Expressed by centimeters.

(6) Resistance to pasteurization

A coating film was subjected to pasteurization at 130° C. for 30 minutes according to THE PHARMACOPOEIA OF JAPAN, TWELFTH EDITION, pages 173–174, 56-1(1)-(iii). Then, the condition of the coating film surface was evaluated with naked eyes.

O: No change
Δ: Slightly attacked
X: Severely attacked (7) Fuming

After coating on a tinplate sheet, baking was conducted at 200° C. for 10 minutes in an oven. Occurrence of fuming during the baking was examined.

O: A very low degree of fuming
Δ: A low degree of fuming
X: A very high degree of fuming

TABLE 1

| | Examples | | | | | |
|---|---|---|---|---|---|---|
| | 1 | 2 | 3 | 4 | 5 | 6 |
| Formulation | | | | | | |
| Resin of Production Example 1 (a1) | | | | | | |
| Resin of Production Example 2 (a2) | | | | | | |
| Resin of Production Example 3 (a3) | | | | | | |
| Resin of Production Example 4 (a4) | | | | | | |
| Resin of Production Example 5 (a5) | 50 | | | | | |
| Resin of Production Example 6 (a6) | | 50 | | | | |
| Resin of Production Example 7 (a7) | | | 50 | | | |
| Resin of Production Example 8 (a8) | | | | 50 | | |

TABLE 1-continued

| | | | | | | |
|---|---|---|---|---|---|---|
| Resin of Production Example 9 (a9) | | | | | 50 | |
| Resin of Production Example 10 (a10) | | | | | | 50 |
| Resin of Production Example 11 (a11) | | | | | | |
| Resin of Production Example 12 (a12) | | | | | | |
| Water-soluble acrylic resin | 50 | 50 | 50 | 50 | 50 | 50 |
| Film properties | | | | | | |
| Gloss | 93 | 91 | 93 | 92 | 91 | 93 |
| Pencil hardness | 2H | 2H | H | 2H | 2H | 2H |
| Cross-cutting | 100/100 | 100/100 | 100/100 | 100/100 | 100/100 | 100/100 |
| Erichsen value (mm) | ≧6 | ≧6 | ≧6 | ≧6 | ≧6 | ≧6 |
| Impact value (cm) | ≧50 | ≧50 | ≧50 | ≧50 | ≧50 | ≧50 |
| Resistance to pasteurization | ○ | ○ | ○ | ○ | ○ | ○ |
| Fuming | ○ | ○ | ○ | ○ | ○ | ○ |

| | Comparative Examples | | | | | |
|---|---|---|---|---|---|---|
| | 1 | 2 | 3 | 4 | 5 | 6 |
| Formulation | | | | | | |
| Resin of Production Example 1 (a1) | | | | | | |
| Resin of Production Example 2 (a2) | | | | | | |
| Resin of Production Example 3 (a3) | | | | | | |
| Resin of Production Example 4 (a4) | | | | | | |
| Resin of Production Example 5 (a5) | 50 | | | | | |
| Resin of Production Example 6 (a6) | | 50 | | | | |
| Resin of Production Example 7 (a7) | | | 50 | | | |
| Resin of Production Example 8 (a8) | | | | 50 | | |
| Resin of Production Example 9 (a9) | | | | | 50 | |
| Resin of Production Example 10 (a10) | | | | | | 50 |
| Resin of Production Example 11 (a11) | | | | | | |
| Resin of Production Example 12 (a12) | | | | | | |
| Water-soluble acrylic resin | 50 | 50 | 50 | 50 | 50 | 50 |
| Film properties | | | | | | |
| Gloss | 92 | 93 | 92 | 94 | 92 | 94 |
| Pencil hardness | 2H | H | B | 2B | H | F |
| Cross-cutting | 50/100 | 75/100 | 100/100 | 100/100 | 100/100 | 100/100 |
| Erichsen value (mm) | 5 | ≧6 | ≧6 | ≧6 | ≧6 | 5 |
| Impact value (cm) | 20 | 30 | 30 | 40 | 50 | 40 |
| Resistance to pasteurization | X | Δ | X | Δ | Δ | X |
| Fuming | X | X | Δ | Δ | Δ | X |

TABLE 2

| | Examples | | | | | |
|---|---|---|---|---|---|---|
| | 7 | 8 | 9 | 10 | 11 | 12 |
| Formulation | | | | | | |
| Resin of Production Example 1 (a1) | | | | | | |
| Resin of Production Example 2 (a2) | | | | | | |
| Resin of Production Example 3 (a3) | | | | | | |
| Resin of Production Example 4 (a4) | | | | | | |
| Resin of Production Example 5 (a5) | 50 | | | | | |
| Resin of Production Example 6 (a6) | | 50 | | | | |
| Resin of Production Example 7 (a7) | | | 50 | | | |
| Resin of Production Example 8 (a8) | | | | 50 | | |
| Resin of Production Example 9 (a9) | | | | | 50 | |
| Resin of Production Example 10 (a10) | | | | | | 50 |
| Resin of Production Example 11 (a11) | | | | | | |
| Resin of Production Example 12 (a12) | | | | | | |
| Water-soluble acrylic resin | 50 | 50 | 50 | 50 | 50 | 50 |
| Film properties | | | | | | |
| Gloss | 92 | 92 | 91 | 92 | 93 | 93 |
| Pencil hardness | 2H | 2H | H | H | 2H | 2H |
| Cross-cutting | 100/100 | 100/100 | 100/100 | 100/100 | 100/100 | 100/100 |
| Erichsen value (mm) | ≧6 | ≧6 | ≧6 | ≧6 | ≧6 | ≧6 |
| Impact value (cm) | ≧50 | ≧50 | ≧50 | ≧50 | ≧50 | ≧50 |
| Resistance to pasteurization | ○ | ○ | ○ | ○ | ○ | ○ |
| Fuming | ○ | ○ | ○ | ○ | ○ | ○ |

TABLE 2-continued

| | Comparative Examples | | | | | |
|---|---|---|---|---|---|---|
| | 7 | 8 | 9 | 10 | 11 | 12 |
| Formulation | | | | | | |
| Resin of Production Example 1 (a1) | 50 | | | | | |
| Resin of Production Example 2 (a2) | | 50 | | | | |
| Resin of Production Example 3 (a3) | | | 50 | | | |
| Resin of Production Example 4 (a4) | | | | 50 | | |
| Resin of Production Example 5 (a5) | | | | | | |
| Resin of Production Example 6 (a6) | | | | | | |
| Resin of Production Example 7 (a7) | | | | | | |
| Resin of Production Example 8 (a8) | | | | | | |
| Resin of Production Example 9 (a9) | | | | | | |
| Resin of Production Example 10 (a10) | | | | | | |
| Resin of Production Example 11 (a11) | | | | | 50 | |
| Resin of Production Example 12 (a12) | | | | | | 50 |
| Water-soluble acrylic resin | 50 | 50 | 50 | 50 | 50 | 50 |
| Film properties | | | | | | |
| Gloss | 93 | 92 | 91 | 93 | 94 | 93 |
| Pencil hardness | H | F | 3B | 4B | F | B |
| Cross-cutting | 50/100 | 50/100 | 100/100 | 100/100 | 100/100 | 100/100 |
| Erichsen value (mm) | 5 | 5 | ≧6 | ≧6 | ≧6 | ≧6 |
| Impact value (cm) | 30 | 30 | 40 | 45 | 50 | 40 |
| Resistance to pasteurization | X | X | X | X | Δ | X |
| Fuming | X | X | Δ | Δ | Δ | X |

I claim:

1. An aqueous resin composition for roll coating an outer surface of an article, comprising:

30–70 parts by weight of a crosslinking agent (A) which is obtained by subjecting 100 parts by weight of alkyl-etherified amino resin and 0.5 to 50 parts by weight of hydroxycarboxylic acid to co-condensation and then subjecting the product to neutralization or partial neutralization with a basic compound until a mononuclear component becomes 40% or less, and which is soluble or dispersible in an aqueous medium, and 70–30 parts by weight of a film-forming resin (B) which is at least one resin selected from acrylic resins and polyester resins and which is soluble or dispersible in an aqueous medium.

2. A resin composition according to claim 1, wherein the alkyl-etherified amino resin is an alkyl-etherification product of an aminotrizaine resin or a urea derivative resin.

3. A resin composition according to claim 1, wherein the alcohol component constituting the alkyl ether is selected from the group consisting of aliphatic alcohols, aromatic alcohols and ether alcohols.

4. A resin composition according to claim 1, wherein the hydroxycarboxylic acid is selected from the group consisting of citric acid, malic acid, tartaric acid, lactic acid, gallic acid, salicylic acid and dimethylolpropionic acid.

5. A resin composition according to claim 1, wherein the co-condensation reaction is conducted in an organic solvent in the temperature range of 60° to 130° C. until the amount of the resulting mononuclear component becomes 40% or less.

6. A resin composition according to claim 1, wherein the basic compound is an alkylamine or an alkanolamine.

7. A resin composition according to claim 1, wherein the acrylic resin is obtained from an α,β-monoethylenically unsaturated carboxylic acid, an alkyl or hydroxyalkyl ester thereof or an acrylamide derivative, or from one of these monomers and a vinyl compound copolymerizable therewith.

8. A resin composition according to claim 1, wherein the polyester resin is an oil-free polyester resin or a resin obtained by modifying an oil-free polyester resin with an oil or a fatty acid.

9. A resin composition according to claim 8, wherein the oil-free polyester resin is obtained by polycondensation between an acid component selected from dicarboxylic acids and polycarboxylic acids and a glycol component selected from glycols and tri- or higher alcohols.

10. A resin composition according to claim 8, wherein the oil-modified polyester resin is obtained by polycondensation between an acid component selected from dicarboxylic acids and polycarboxylic acids, a glycol selected from glycols and tri- or higher alcohols, and an oil or a fatty acid.

11. A resin composition according to claim 1, which is obtained by compounding the crosslinking agent (A) and the film-forming resin (B) with at least one additive selected from the group consisting of a surface-smoothening agent, a dispersing agent, a tackifier, a defoaming agent and a pigment.

12. A resin composition according to claim 1, which is obtained by compounding the crosslinking agent (A) and the film-forming resin (B) with a curing aid, i.e. an aromatic sulfonic acid or an amine-blocked aromatic sulfonic acid.

* * * * *